United States Patent
Balleys (10) Patent No.: US 6,465,754 B1
(45) Date of Patent: Oct. 15, 2002

(54) PROCESS AND DEVICE FOR MACHINING BY ELECTROEROSION

(75) Inventor: François Balleys, Satigny (CH)

(73) Assignee: Charmilles Technologies SA, Meyrin (CH)

(*) Notice: Subject to any disclaimer, the term of this patent is extended or adjusted under 35 U.S.C. 154(b) by 74 days.

(21) Appl. No.: 09/705,881

(22) Filed: Nov. 6, 2000

(30) Foreign Application Priority Data

Nov. 5, 1999 (CH) .............................................. 2026/99

(51) Int. Cl.[7] .................................................. B23H 1/02
(52) U.S. Cl. .................................. 219/69.13; 219/69.18
(58) Field of Search ........................... 219/69.13, 69.18, 219/69.17

(56) References Cited

U.S. PATENT DOCUMENTS 4,447,696 A   5/1984   Niwa ........................ 219/69.18
5,698,115 A   12/1997  Goto et al. ............... 219/69.18

FOREIGN PATENT DOCUMENTS

| EP | 0545156 A2 | 6/1993 | |
| JP | 59-232726 A | * 12/1984 | .............. 219/69.13 |
| JP | 63-260721 | 10/1988 | |
| JP | 3-294116 | 12/1991 | |

OTHER PUBLICATIONS

Brown, EDM DIGEST, Jul. 1984, vol. VI, No. 4, pp. 16–19,22–25 and 36, "Technological Aspects of Spark Erosion".*

* cited by examiner

*Primary Examiner*—Geoffrey S. Evans
(74) *Attorney, Agent, or Firm*—Young & Thompson (57) ABSTRACT

The process and device for machining by electroerosion are arranged so as to produce during each erosive discharge the following succession of phases: a delay phase ($t_D$) during which an alternating voltage is applied between the tool and the piece at a frequency such that the ions present in the machining fluid follow shorter oscillating paths than the machining distance, separating the tool and the piece, a sparking phase ($t_A$) including a lag period ($t_R$) and an erosive discharge phase ($t_C$) and a pause phase ($t_B$) during which no voltage is applied so that the ionized path through the machining fluid disappears. There is thus obtained the complete suppression of all phenomena of electrolysis and deterioration of the tool and of the piece and a high efficiency of triggering and machining.

20 Claims, 9 Drawing Sheets fig.1 fig.2A fig.2B fig.3A fig.3B fig.4A fig.4B fig.5A fig.5B fig.6A fig.6B fig.7A fig.7B fig.8A fig.8B fig.9A fig.9B fig.10A fig.10B fig.11 fig.12

PROCESS AND DEVICE FOR MACHINING BY ELECTROEROSION

The present invention has for its object a process and a device for machining by electroerosion, according to which a piece is machined by means of a tool, they being separated from each other by a machining distance of a working space in which is located a machining fluid, by applying an electrical voltage between the tool and the piece to cause erosive discharges.

The processes and devices for machining by electroerosion uses tools electrodes which can be wires, tubes or electrodes having any shape. The electrode is not in physical contact with the piece; it is separated therefrom by a fluid.

Certain users of machines have observed that the duration of the life of the tools produced by electroerosion can be shorter than that of the tools produced by conventional mechanical methods.

The cause of this problem is an electrolytic phenomenon which damages the surfaces of the pieces machined by electroerosion. Electrolysis can render the machined surfaces less hard and less homogeneous than before their machining. This is particularly the case when the machined piece is of a sintered material.

Electrolysis, which takes place during machining, is an undesirable secondary effect which is produced with all the machines using water, or any other liquid or fluid whose conductivity is too high to separate the electrode from the piece.

The effects of electrolysis are proportional to the conductivity of the liquid, which is to say its content of electric charge carriers (ions and electrons). This is why, when water is used, it must be deionized so that it contains as few ions as possible. But its nature is such that even very pure water contains ions in suspension.

To machine a piece by electroerosion, it is well known that it is necessary first to apply a voltage between the electrode and the piece. It is also well known that the current discharge serving for machining does not take place immediately after application of the voltage, but that there is a certain delay which is called the delay time by those skilled in the art.

During this delay time $t_D$, under the influence of the electric field, the ions of negative polarity present in the liquid are drawn by the piece of positive polarity and continuously bombard it.

The ions also react chemically with the piece, forming salts which in turn go into solution. In other words, the metal at the surface of the piece is subjected to metal-lurgical modifications.

To avoid this undesirable electrolysis phenomenon, there are used fluids which contain only few ions. The fluid therefore should not take part in an electrochemical process. There has thus been used as the dielectric fluid, mineral oil.

However, the absence of electrically charged particles in the oil is not assured, particularly during machining in which the oil contains many eroded particles created by electroerosion, as well as molecules from the cracking of the oil caused by the discharges. Such a counter-measure can accordingly only decrease the problem of electrolysis.

Moreover, in the case of machining with wire electrodes, the solution consisting in using oils as the dielectric is an alternative whose principal drawback is a great reduction of the speed of machining.

In the case of machining with massive electrodes, oil does not eliminate the risk of the appearance of electrically charged machining sludge which agglomerates and clings to one of the electrodes.

It is also possible to maintain the conductivity of the water at as low a level as possible. This solution only decreases the problem because it has been determined that it is not possible to obtain water which contains no ions.

There have also been carried out certain machining steps, in particular finishing passes, by reversing the polarity applied between the electrode and the piece. In this case, the electrode has a positive electrical charge relative to the piece. Thus, the electrochemical phenomenon to be avoided on the piece, is transferred to the electrode. The drawback of this approach is that the finishing operations become slower, without at the same time completely avoiding the electrolysis phenomenon.

There has also been proposed in the patents CH 536166 and U.S. Pat. No. 4,347,425, using a generator comprising two voltage sources, of opposite polarities. These sources can be engaged such that the electrode and the piece have, during the delay time, a polarity opposite to that which they have during establishment of the principal current discharge. The damaging effects of electrolysis can thus be reduced. But these generators are not able to prevent electrolysis from happening.

Other solutions to guard against electrolysis consist in starting the voltage sources, continued and applied intermittently as in EP 0 545 156 or alternately and at high frequency as in U.S. Pat. No. 4,447,696 or U.S. Pat. No. 5,698,115 during a pause time separating two successive current discharges between the electrode and the piece. These solutions have the drawback of not avoiding electrolysis when it is particularly great, which is to say during the delay time $t_D$ when the generally high triggering voltage is applied.

The present invention has for its object to overcome these drawbacks and to provide a process and device for machining by electroerosion permitting avoiding the electrolysis phenomena.

The invention is characterized to this end by the following sequence of phases during erosive discharge:

a) a delay phase during which the alternating voltage has a frequency applied between the tool and the piece such that ions present in the machining fluid follow oscillating paths substantially shorter than said machining distance separating the tool and the piece and during which an ionized passage is created between the tool and the piece by the effect of said alternating voltage, b) a spark phase beginning with the detection of a current flowing between the tool and the piece and during which a source of continuous voltage forms and applies an erosive discharge current, and c) a pause phase during which no voltage is applied between the tool and the piece such that the machining fluid present between the tool and the piece deionizes and the ionized path disappears;

and by the fact that this sequence of phases is repeated throughout the machining.

These characteristics permit obtaining a machining process without an electrolysis phenomenon, with easy triggering of the discharges and high machining efficiency, whilst avoiding deterioration of the piece or the tool, for example breaking of the wire, by application of excessive heat to a given portion of this tool.

Preferably, the process is characterized by the fact that the frequency of said alternating voltage is at least 100 kHz for a working space providing a machining distance of 30 to 40 microns, by the fact that this frequency is increased when said distance is decreased, and by the fact that this frequency is substantially 10 MHz for a distance substantially equal to 1 micron.

Thus the oscillating path of the ions is much shorter than the machining distance and all bombardment of the piece and the tool by the ions present in the machining liquid can be avoided.

According to a preferred modification, the frequency of the alternating voltage is variable during the delay time.

Preferably, the frequency of the alternating voltage decreases progressively within the delay phase so as to sweep a spectrum of frequencies.

These characteristics permit improving effectively the production of an ionized path and hence the triggering of the discharges.

Preferably, there is established an alternating voltage such that the duration of the negative pulses will be different from that of the positive pulses.

The mean voltage can thus be adapted across the machining gap or distance so as to guarantee the absence of any electrolysis phenomenon, while optimizing the machining conditions.

These advantages can be further improved by the fact that there is established an alternating voltage such that the amplitude of the negative pulses will be different from that of the positive pulses.

According to an interesting modification, the alternating voltage is blocked over the random polarity present at the moment of detection of a current between the tool and the piece.

These characteristics permit avoiding the extinction of a discharge triggered by a change of polarity during establishment of the erosive discharge.

Another modification of the process is characterized by the fact that the alternating voltage is blocked upon the detection of a current between the tool and the piece by the fact that said predetermined polarity is preferably that which corresponds to the polarity of the continuous voltage source.

These characteristics also permit reducing the risk of extinction while preserving measures against the electrolysis phenomena.

A particularly favorable modification of the process is characterized by the fact that the sparking phase is subdivided into a delay time corresponding to the duration of triggering of the principal discharge by the continuous voltage source, and a current time corresponding to the erosive discharge, and by the fact that the duration of said delay time is adjusted such that there is obtained for each erosive discharge at least one complete period of the alternating voltage comprising a positive pulse and a negative pulse.

These characteristics also permit refining in a controlled and precise fashion the anti-electrolytic measures.

Thus, the lag time is preferably regulated such that $$Tr \geq T - t_D$$

in which $T_R$ is the duration of the time lag $T$ is the period of alternating voltage, and $T_D$ is the duration of the delay phase The present invention also relates to a device for practicing a process for machining by electroerosion according to which a piece is machined by means of a tool, they being separated from each other by a machining distance of a working space in which is located a machining fluid, by applying an electrical voltage between the tool and the piece, characterized by the fact that it comprises in combination an alternating voltage source arranged to produce during a delay phase an alternating voltage at a frequency such that, between the tool and the piece, the ions present in the machining fluid follow an oscillating path substantially shorter than the machining distance and that an ionized path is created between the tool and the piece, a detector adapted to detect a current between the tool and the piece, a source of continuous voltage arranged so as to form and maintain an erosive discharge current during a sparking phase beginning with the detection of a current between the tool and the electrode, and a control unit arranged to start said alternating and continuous voltage sources so as to obtain during erosive discharges a succession of phases comprising said delay phase, said sparking phase, and a pause phase during which no voltage is applied between the tool and the piece, such that the machining fluid between the tool and the piece deionizes and the ionized path disappears.

The device thus permits eliminating all electrolytic phenomena while permitting effective machining without thermal damage to the tool or to the piece.

The characteristics according to the present invention require that during the delay phase, the ions move only very little under the influence of the high frequency alternating electric field. The ions oscillate about an equilibrium position, but the distance over which oscillation takes place is very much less than the width of the space between the tool and the piece. Thus, no ionic bombardment is possible. On the other hand, the mobility of the electrons, several tens of thousands times lighter than the lightest ions, is such that they can follow a high frequency electrical field and thus permit triggering. The pause phase is necessary to deionize completely the dielectric of the gap, which accordingly does not preserve any memory of the position of the ionized path of the preceding discharge. It is thus avoided that two or more discharges take place at the same spot and give rise to damage to the tool or to the piece, for example breaking of the wire, by excessive application of heat to this spot.

Other advantages flow from the characteristics set forth in the dependent claims and from the description hereafter of the invention, in greater detail, with the help of the drawings which show schematically and by way of example an embodiment of the process and the device of these modifications.

Figure 1:
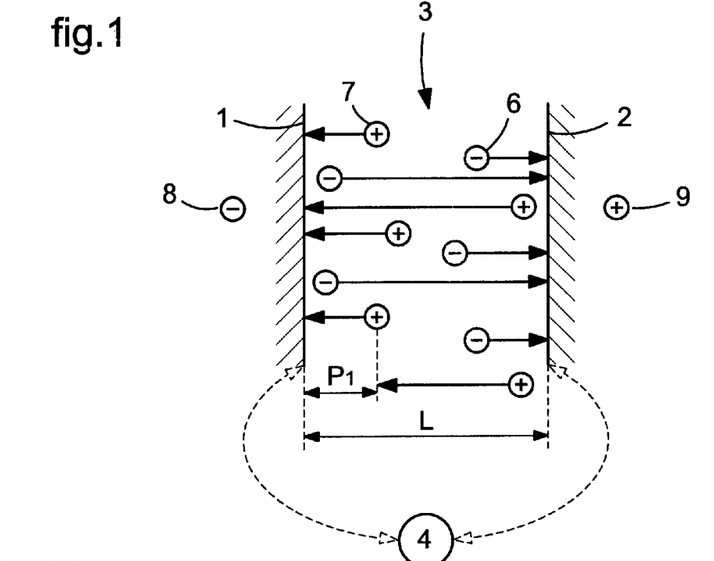
FIG. 1 shows schematically the space between the electrode or the tool and the piece, and the movement of the ions during the delay phase of a discharge in a known machining process and shown in FIGS. 2A and 2B.

Referring to FIG. 1, the known devices for machining by electroerosion generally comprise an electrode 1 serving as a tool and a piece 2 to be machined at least partially contained in a machining fluid or a liquid 3. A voltage source 4 permits applying for example across a resistance a voltage between the electrode 1 and the piece 2 after closing a switch 5.

Figure 2A:
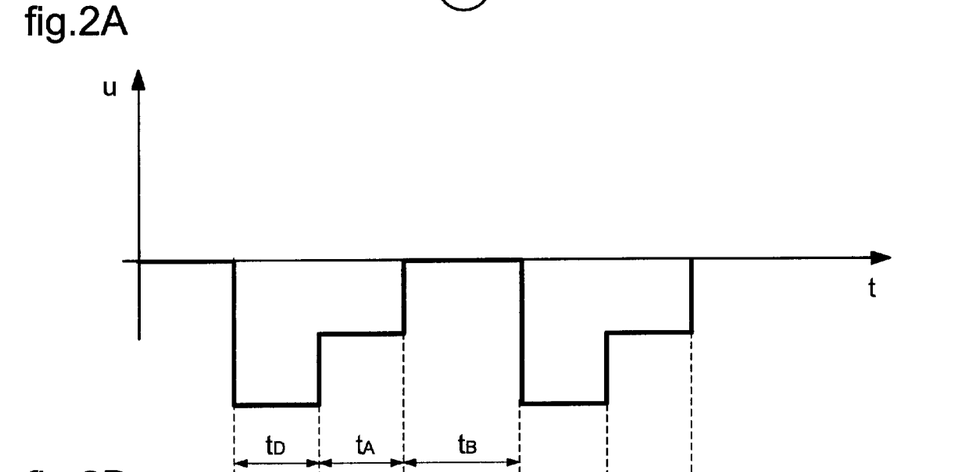
FIGS. 2A and 2B are diagrams showing respectively the voltage and the current during discharges generated in a known process.
Figure 2B:
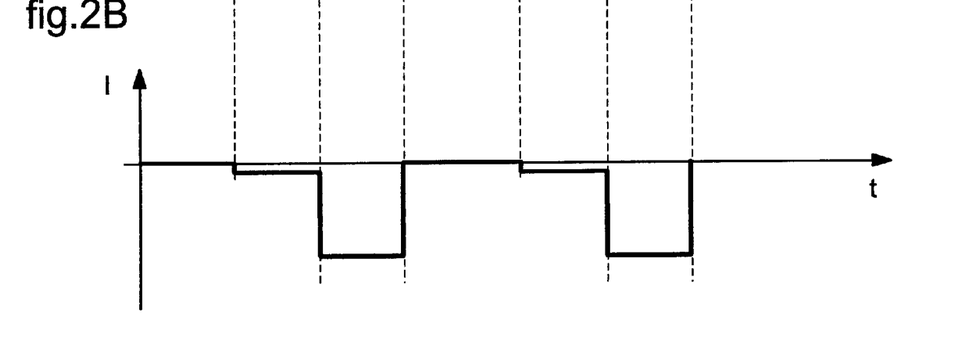

FIGS. 2A and 2B show, correspondingly with FIG. 1, and in a known manner, the voltage (FIG. 2A) and the current (FIG. 2B) in the working space of a width L between the electrode and the piece.

It is well known that, for an erosive current discharge to take place between the electrode 1 and the piece 2, it is necessary first to apply, with the aid of a voltage source 4, a voltage between the electrode 1 and the piece 2. The time $t_D$ during which the voltage is applied without any current passing between the electrode 1 and the piece 2, except of course the small current due to the electrolytic conductivity of the machining liquid 3, is indicated in FIG. 2A and this phase is commonly called the delay time $t_D$ by those skilled in the art. During this time of random duration, the voltage between the electrode 1 and the piece 2 is as indicated in FIG. 2A while there flows only ionic current between electrode 1 and piece 2, as shown in FIG. 2B. This low current is of the order of 0.1 to 1 A in normal practice. After this time of variable duration has passed, it is also well known that an erosive current discharge takes place between the electrode 1 and the piece 2. The time during which the erosive current discharge takes place is indicated by $t_A$ in FIG. 2A. During this time, the value of the voltage between the electrode and the piece 2 falls, as shown in FIG. 2A, while the current is established between the electrode 1 and the piece 2 as shown for example in FIG. 2B. It is also well known that to avoid the formation, between electrode 1 and piece 2, of an electric arc which could damage the piece 2, the flow of current between the electrode 1 and the piece 2 must be interrupted for a time of predetermined duration, as indicated in FIG. 2A. This is carried out by well-known means, for example by using a device (not shown) which controls the closing and opening of one or several switches to permit or prevent the application of voltage between the electrode 1 and the piece 2. The voltage and the current between the electrode 1 and the piece 2 become zero after opening, as indicated in FIGS. 2A and 2B.

FIG. 1 shows, according to the state of the art and in correspondence with FIGS. 2A and 2B, the mean movement P1 of the ions, having a negative electric charge 6 and having a positive electric charge 7, during the delay time $t_D$, in the space of width L containing the dielectric fluid 3 separating the electrode 1 and the piece 2. During this delay time $t_D$, the voltage source 4 applies a voltage such that the electrode 1 has a negative electric change 8 and the piece 2 has a positive electric change 9. As a result, the ions having a positive electric charge 7 will bombard the electrode 1 and the ions having a negative electric charge 6 will bombard the piece 2, giving rise to the dialysis phenomenon which damages its surface.

Figure 3A:
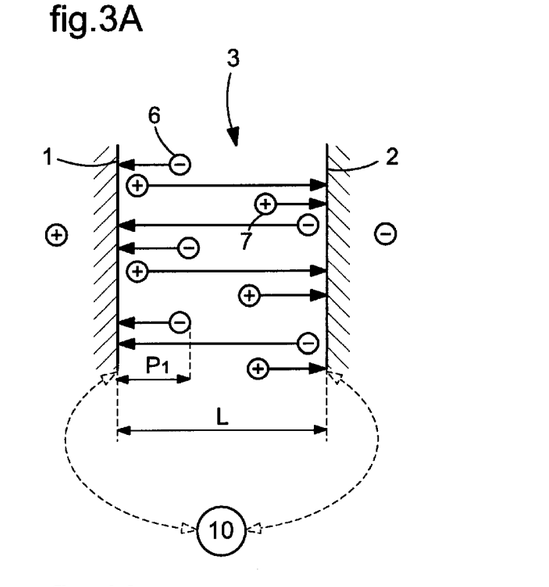
FIGS. 3A and 3B show schematically the space between the electrode and the piece and the movement of the ions during the delay phase of a discharge, and during the current discharge, respectively, in another known machining process and shown in FIGS. 4A and 4B.
Figure 3B:
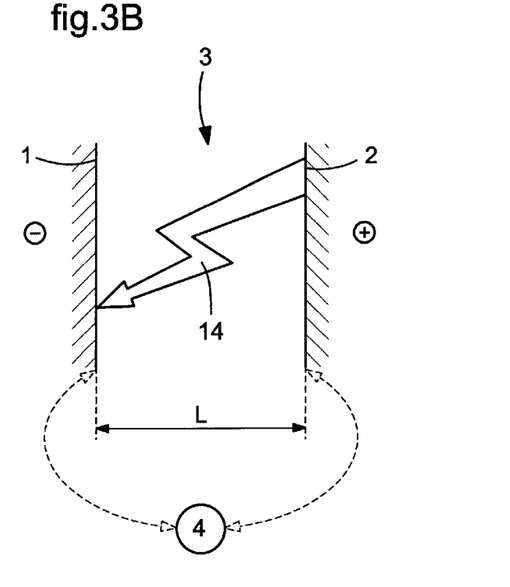
Figure 4A:
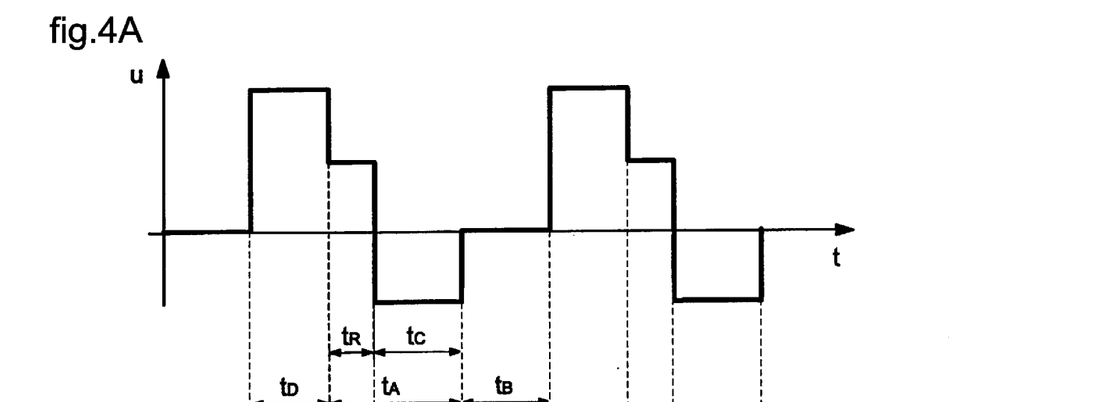
FIGS. 4A and 4B show diagrams of the voltage and the current, respectively, during erosive discharges in another known process.
Figure 4B:
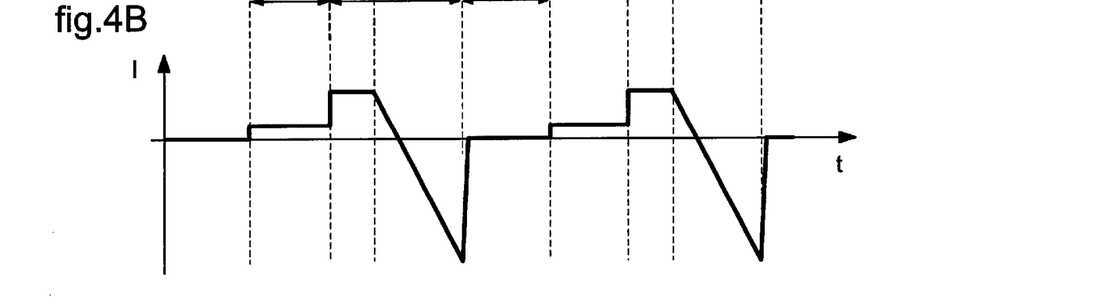

FIGS. 3A and 3B, corresponding to FIGS. 4A and 4B, relate to other known devices in the art and which have for their object to decrease the undesirable effects of electrolysis. These devices comprise at least two voltage sources 4 and 10 of opposite polarities. During the delay time $t_D$, the voltage source 4 applies no voltage to the electrode 1 and the piece 2. During this same delay time $t_D$, the voltage source 10 applies to the electrode 1 and the piece 2 a voltage of polarity opposite that which is applied to them by the voltage source 4 during a time $t_A$ during which the principal discharge of the erosive current takes place. A control unit permitting switching of the voltage source 10 and the voltage source 4 is not shown in the drawing, for simplicity. Thus, during the delay time $t_D$, the voltage between electrode 1 and piece 2 is of a polarity opposite that applied during the discharge, as shown in FIG. 4A, while only a small ionic current flows between the electrode 1 and the piece 2, as indicated in FIG. 4B. After the time $t_D$ has passed, a conductive passage forms in the dielectric fluid 3 and a current is established between the electrode 1 and the piece 2, as shown in FIG. 4B. A device for detecting this current (not shown, as it is well known in the art), detects the sudden current increase between the electrode 1 and the piece 2, and the control unit, also well known in the art and hence not shown, triggers the voltage source 10 and engages the voltage source 4 to generate the principal discharge of erosive current. Thus, during the delay time $t_D$, the voltage between the electrode 1 and the piece 2 is of a polarity opposite to that applied during the principal discharge, as shown in FIGS. 4A and 4B.

It is to be noted that the delay time $t_D$ comes to an end after a random duration as soon as an increase in the voltage between the electrode 1 and the piece 2 is detected. Simultaneously, at time $t_A$ or sparking time begins. This time $t_A$ is subdivided into a lag time $t_R$ or preparation time, and a time $t_C$ or discharge time properly so-called. Upon detection of a current between the electrode and the piece, and hence at the beginning of time $t_R$ and $t_A$, the principal voltage source 4 is turned on. However, there is a delay, of a predetermined duration, of powering of the electronic and electrical circuits of the source 4 corresponding to this lag time $t_R$, until the voltage (FIG. 4A) and the current (FIG. 4B) reverse. At the moment of reversal of the voltage, the lag time $t_R$ comes to an end and the discharge time $t_C$ begins, during which discharge takes place.

FIG. 3 show, according to the state of the art and corresponding to FIGS. 4A and 4B, the movement P1 of the ions, having a negative electric charge 6 and having a positive electric charge 7, during the time $t_D$, within the space of width L containing the dielectric fluid 3 separating the electrode 1 and the piece 2. During this time $t_D$, the voltage source 10 applies a voltage such that the electrode 1 has a positive electrical charge and the piece 2 has a negative electrical charge. As a result, the ions having a negative electric charge 6 no longer bombard the piece 2, as is the case in FIG. 2, but will bombard the electrode 1 and the ions having a positive electric charge 7 no longer bombard the electrode 1 but will bombard the piece 2 and will give rise to an electrolysis phenomenon less damaging to the piece 2 than that resulting from the ions having a negative electric charge, without however completely avoiding the phenomenon of electrolysis.

FIG. 3B shows, according to the state of the art and corresponding to FIGS. 4A and 4B, the space of a width L containing the dielectric fluid 3 separating the electrode 1 and the piece 2, during the time $t_C$ in the course of which takes place the principal discharge of erosive current 14. The voltage source 10 is de-actuated and the voltage source 4 is actuated, thereby generating the principal discharge of erosive current 14.

The generators operate according to the known principle, permitting reducing somewhat the electrolysis phenomena; however, they do not permit totally avoiding electrolysis taking place, because the ions are not blocked during the delay time $t_D$.

Figure 5A:
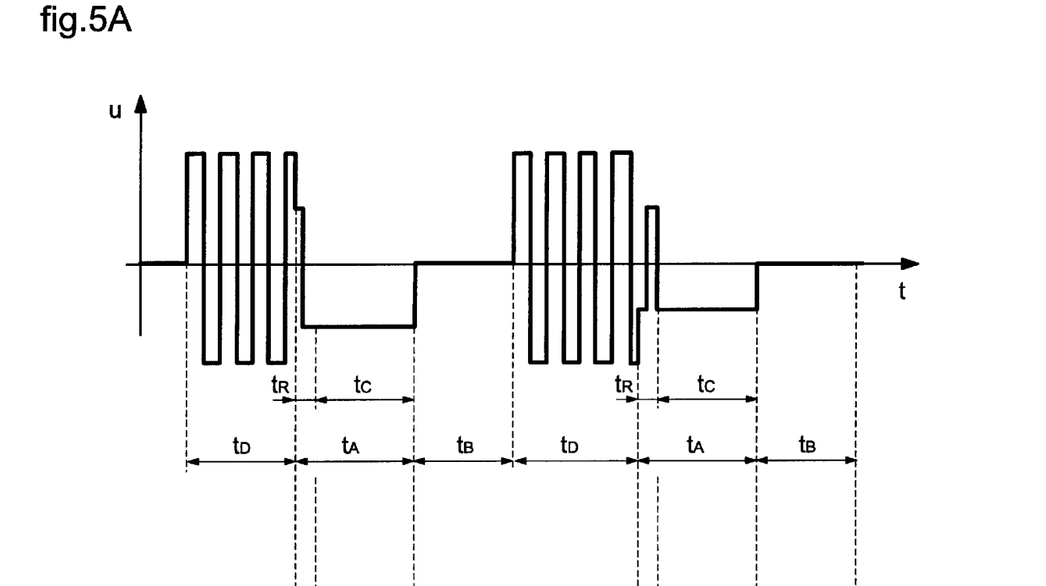
FIGS. 5A and 5B show diagrams of the voltage and the current, respectively, during erosive discharges produced according to an embodiment of the process of the present invention.
Figure 5B:
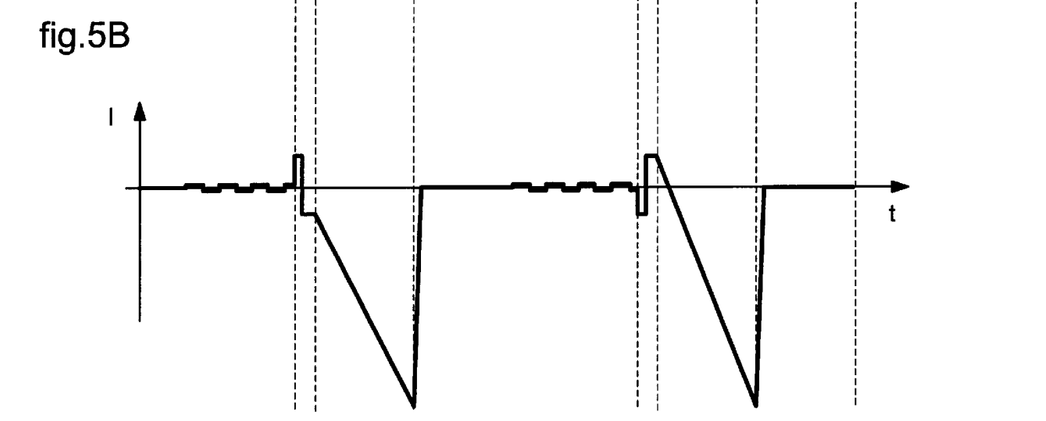

According to a first embodiment of the process according to the invention, shown in FIGS. 5A and 5B, there is carried out the following sequences of phases during erosive discharges:

During a delay phase $t_D$, there is applied an alternating voltage between the electrode and the piece, thanks to a source of alternating voltage. The frequency of this voltage is fixed at a value such that the ions present in the fluid follow short oscillating paths, in all cases substantially shorter than the machining distance L separating the electrode and the piece. The frequency could typically be selected between 0.1 and 10 MHz. During this delay phase $t_D$, no ionic current passes through the working space or gap G between the electrode 1 and the piece 2. By ionic current is meant a current due to movement of the ions passing from the electrode to the piece, or vice versa. The voltage between the electrode and the piece changes in polarity with a frequency which is constant in FIG. 5A. There is noted during this phase a small galvanic current generally less than 0.5 A due to the distributed capacities of the electrodes comprising the piece and the tool, which charge and discharge, as indicated in FIG. 5B.

After a duration that varies randomly depending on the physical and chemical conditions of the gap, which could typically be 1 μsec with extreme values of 15 μsec, a conductive path forms in the fluid or dielectric liquid 3 and a current begins to be established between the electrode and the piece, while the triggering voltage U decreases considerably. A suitable detection device detects a sudden increase of the current and starts a continuous voltage source to generate and maintain the principal discharge of erosive current during the next phase, the so-called sparking phase $t_A$. This latter is in fact subdivided into two separate periods, a first period $t_R$ during which only a small current of the order of 2 to 6 A flows between the electrode and the piece and whose polarity depends again on the polarity of the alternating voltage of the alternating voltage source. This first period corresponds to a lag time $t_R$ or preparation time corresponding to the duration of engagement of the principal discharge, during which time the principal discharge current commences. The duration of this lag time $t_R$ depends on the electrical and electronic circuits of the continuous voltage generator and is substantially constant for each erosive discharge during machining. Its duration is typically from 0.2 to 0.4 μsec.

The second period $t_C$ of this sparking phase $t_A$ corresponds to a current time during which the erosive discharge takes place and is maintained by the continuous voltage source. The duration of this sparking phase $t_A$ is fixed so as to obtain optimum efficiency and quality of machining. The duration of the sparking phase could typically be 2 μsec, it being understood of course that those skilled in the art will fix its value according to predetermined experimental data.

The end of this phase and the beginning of the following pause phase $t_B$ is obtained by cutting off the sources of continuous and alternating voltage. During pause phase $t_B$, no voltage is applied between the electrode and the piece, such that the machining fluid or liquid present between the electrode and the piece deionizes and the ionized path disappears entirely. The conductivity of the gap decreases very rapidly.

In fact, the cycle of phases of each discharge begins with a pause time or phase $t_B$ during which this deionization takes place. Thus, the gap retains no memory of the position of the ionized path of the previous discharge. This pause phase is absolutely necessary because it avoids two discharges or series of discharges taking place successively at the same place and leading to a breaking of the wire by the application of excessive heat to this place. Its duration is preferably between 1 and 20 μsec. Thus, each discharge is preceded by a random time, called a delay phase or time $t_D$ during which a new ionized path is created and the conductivity of the gap increases progressively and more and more rapidly.

The described arrangement requires that during the delay phase $t_D$, the ions move only very little under the effect of the high frequency alternating electric field. This same arrangement permits triggering the discharges with a random polarity.

The ions, because of the alternating high frequency voltage, oscillate about an equilibrium position; the distance over which the oscillation takes place is very much less than the width of the space between the electrode and the piece. Thus, no ionic bombardment is possible.

By contrast, the mobility of the electrons is such that they can follow this high frequency electric field and thereby permit triggering. Thus, the ions and the electrons are subjected to the same electrical field, and hence to the same forces, but the electrons are several tens of thousands of times lighter than the lightest ions.

It has been shown experimentally that a minimum frequency of application of alternating voltage of 100 kHz was necessary for distances between the wire and the piece of 30 to 40 microns, such that the anti-electrolytic effect will be appreciable. These distances are such as are encountered during roughing out of a piece by a wire machine.

When the distances between the wire and the piece become less, a higher frequency is needed and when the gaps are no more than several microns, as is the case when finishing, a frequency of 10 MHz is necessary.

It is also possible to take account, during the choice of the frequency of alternating voltage, of the nature of the ions contained in the dielectrical fluid such that their oscillating paths will be very controlled. Thus ions of low molecular weight and/or with a high electrical charge require a substantially higher frequency than ions of high molecular weight and/or with low electrical charge.

Figure 10A:
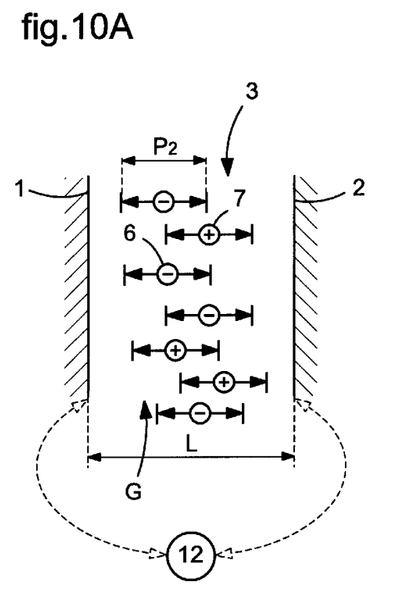
FIGS. 10A and 10B show schematically the space between the electrode and the piece during the delay phase of a discharge and during the current discharge, respectively, using the process according to the present invention.

FIG. 10A shows, according to the invention and corresponding to FIGS. 5A and 5B, a mean displacement PA of the ions, having a negative electric charge 6 and having a positive electric charge 7, during the delay phase $t_D$, in the working space G of width L containing dielectric fluid 3 separating electrode 1 and piece 2. During this delay phase $t_D$, an alternating voltage source 12 applies a voltage of alternating polarity and high frequency such that the electric charge of electrode 1 will be successively positive and negative with a high frequency and that the electric charge of the piece 2 will be successively negative and positive with a high frequency. As a result, the ions having a positive electric charge 7, as well as the ions having a negative electric charge 6, oscillate about an equilibrium position with a mean distance P2 that is travelled, less than the width L of the space separating electrode 1 and the piece. Thus, both the ions having a positive electric charge 7 and the ions having a negative electric charge 6 cannot bombard either the piece 2 or the electrode 1. The electrolytic phenomenon is thus completely eliminated.

Figure 10B:
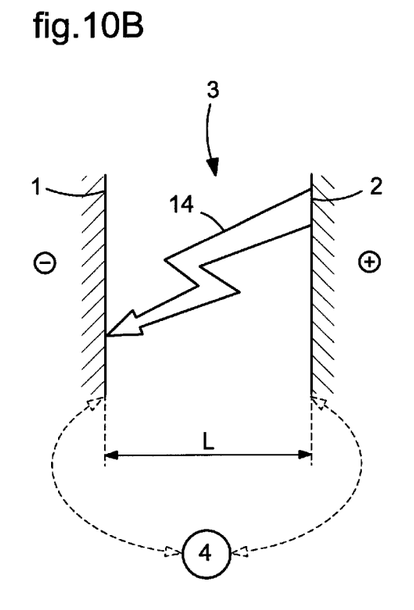

FIG. 10B shows the working space G containing the dielectric fluid 3 separating the electrode 1 and the piece 2, during the discharge phase $t_C$ in the course of which takes place the principal discharge 14 of erosion current under the influence of a turned-on source of continuous voltage 4.

The electrical/electronic circuits connecting these sources 12 and 4 to the electrode and to the piece are not shown, but could comprise for the alternating voltage source 12 a current limiter and for the continuous voltage source switching transistors.

Figure 6A:
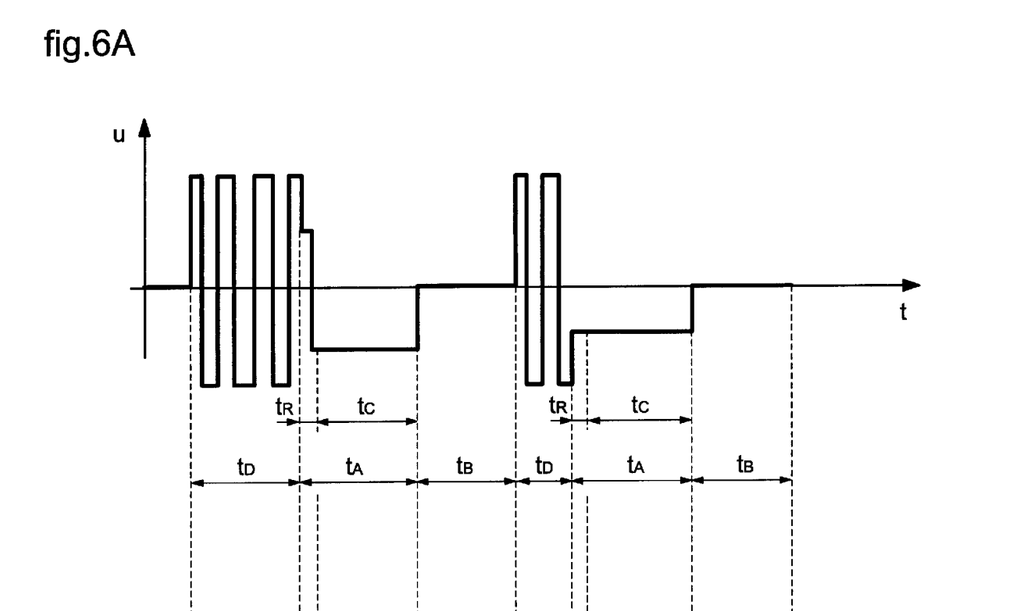
FIGS. 6A and 6B, 7A and 7B, 8A and 8B, 9A and 9B show diagrams of the voltage and the current, respectively, during erosive discharges produced according to four modifications of the process of the present invention.
Figure 6B:
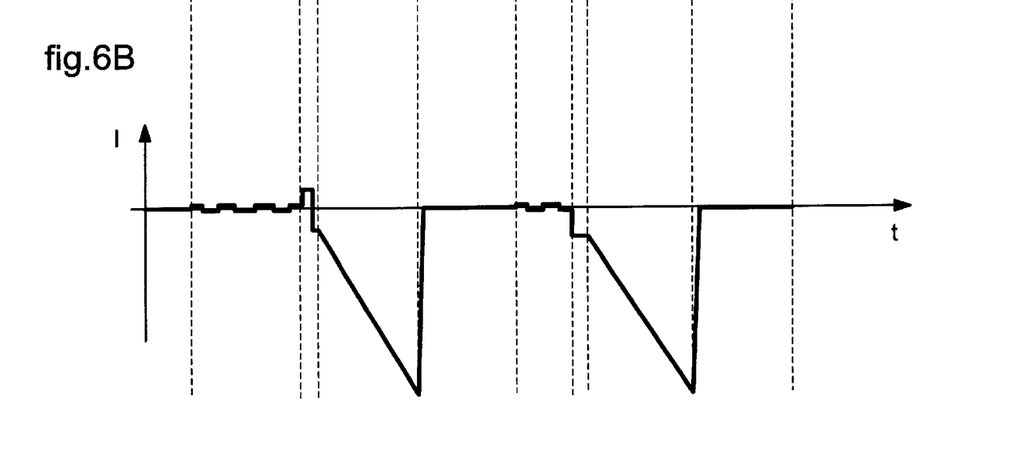

In a modification of the process according to the invention shown in FIGS. 6A and 6B, showing the voltage U and the current I between the electrode and the piece, the frequency of the alternating voltage source 12 is not constant, but this frequency is variable and decreases gradually with time t. There is thus carried out a sweeping of the spectrum of the frequencies of the alternating voltage to search for the most suitable frequency to form an ionized path and a current through the gap G. This spectrum of frequencies could also be modulated so as to increase and decreases successively. Of course the following phases of sparking $t_A$, of lag $t_R$, of discharge $t_C$ and of pause $t_B$ remain unchanged. This modification is particularly well adapted for conditions of machining with difficult triggering.

Figure 7A:
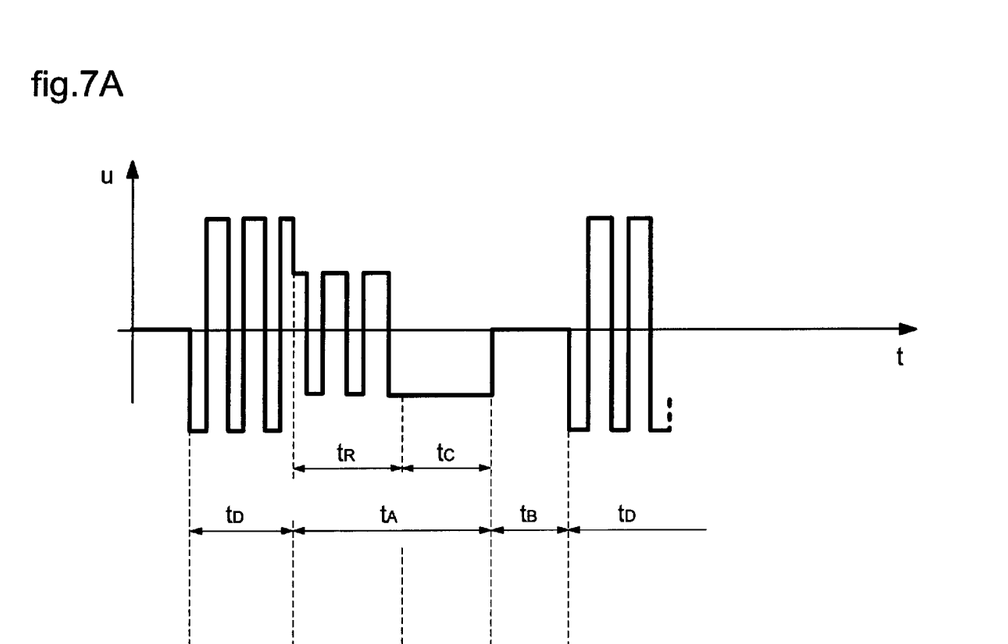
Figure 7B:
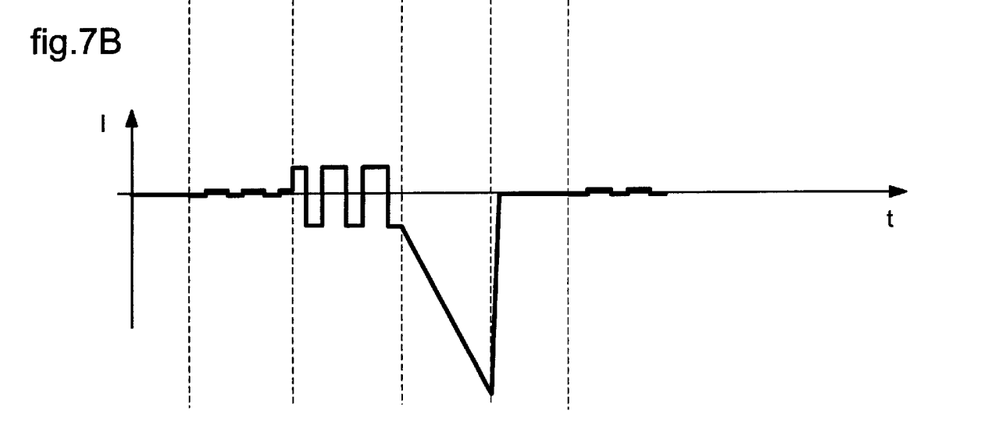

According to a second modification of the process shown in FIGS. 7A and 7B, showing the voltage U and the current I between the electrode and the piece, the frequency of the alternating voltage source 12 is modulated as to the width of pulses according to a so-called PWM (pulse width modulation) process. Thus the duration of the negative pulses is different, for example less, than that of the positive pulses, such that a certain positive or negative polarization can be obtained through the gap during the delay phase $t_D$.

Figure 8A:
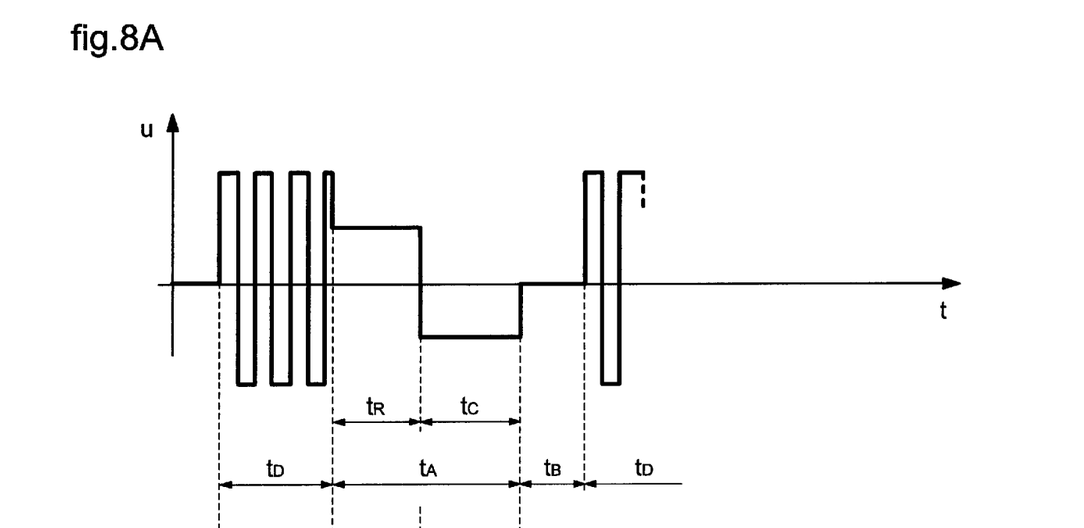
Figure 8B:
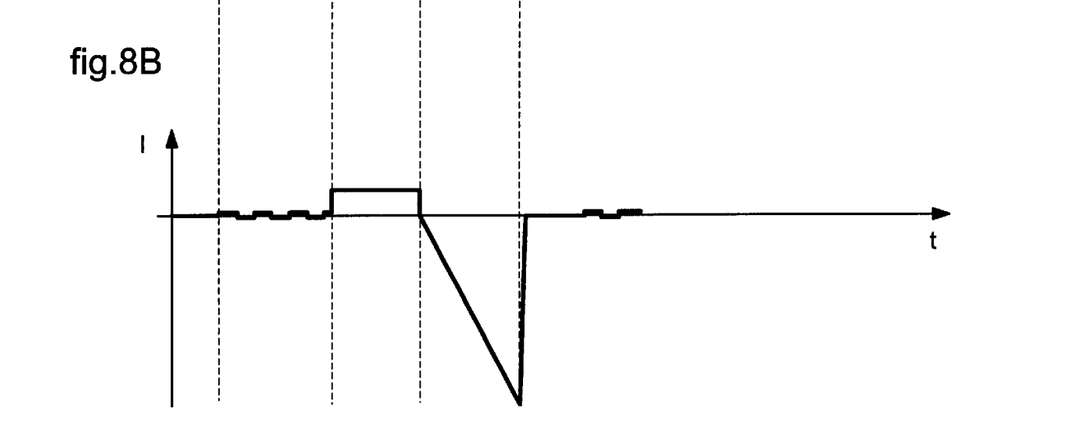

A third modification of the machining process is shown in FIGS. 8A and 8B showing the voltage and the current between the electrode and the piece during the different phases of the process. Thus, as soon as a current is detected, the alternating voltage is stopped and the voltage is blocked, upon the beginning of the lag phase $t_R$, at the positive or negative polarity. Thus, this polarity could be random and could correspond to that present during the appearance and the detection of the current between the electrode and the piece. This polarity could also be predetermined and always correspond to a same polarity.

In this third modification, an immediate cessation of the alternating voltage of random polarity present during appearance of a current, and hence upon the beginning of the lagged phase $t_R$, permits guarding against the extinction of triggering which could take place during a change of polarity.

If on the contrary it is desired absolutely to avoid any electrolysis phenomenon, the alternation of the voltage will be stopped always at the same polarity, for example the positive polarity, if the voltage of the continuous source responsible for the erosive discharge is negative. There exists for this modification however a small risk that the spark will not be extinguished during change of polarity.

Figure 9A:
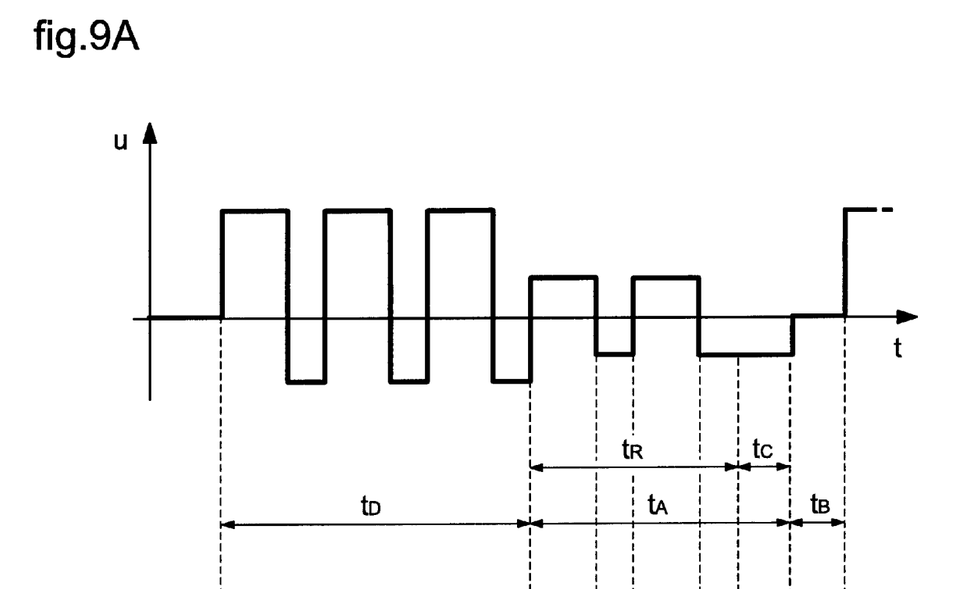
Figure 9B:
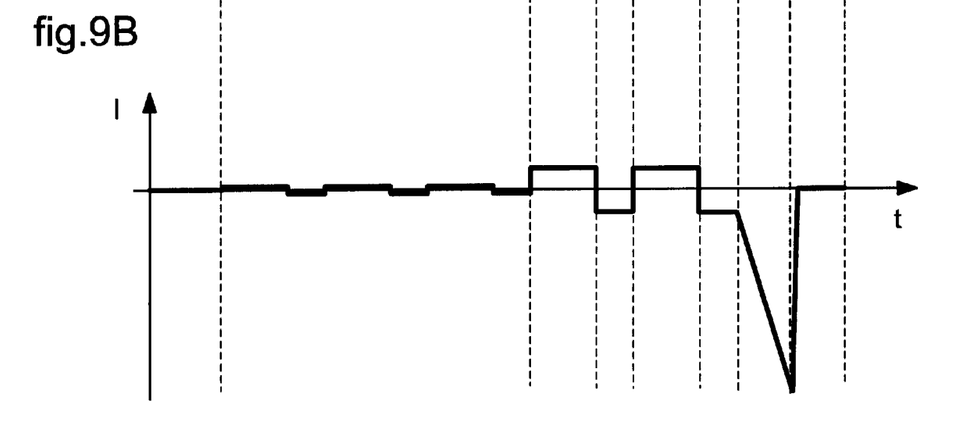

A fourth modification of the process is shown in FIGS. 9A and 9B, showing the voltage and the current through the gap as a function of time. In this modification, there is also applied an alternating voltage between the electrode and the piece during the delay time $t_D$ and the sparking time $t_A$. However, in this modification, not only the amplitude but also the duration of the positive pulses are different from the negative pulses. These positive and negative pulses could moreover be modulated according to a predetermined cyclic ratio.

During the delay phase $t_D$, the positive pulses of voltage U have a different amplitude, for example greater, than that of the negative pulses, while no current I flows through the gap, except a small current due to the electrolytic conductivity of the machining liquid.

After the delay phase $t_D$ of random duration, there is formed a conductive path in the electrolytic fluid and a sudden discharge current is established between the tool electrode and the piece, as shown in FIG. 9B. A device for detecting this discharge current detects the passage of the current between the electrode 1 and the piece 2, and another device turns on the continuous voltage source to generate the principal discharge of erosive current which establishes itself after a lag phase $t_R$.

Not only in the second modification but also in the fourth modification (FIGS. 7A and 9A) the high frequency alternating voltage could be fixed such that the mean voltage during a discharge will be either zero, or positive or negative.

It should be noted that in all these machining processes described above, the value of the voltage U decreases upon the appearance of the current I at the beginning of the sparking phase $t_A$ and of the lag phase $t_R$. At the end of the lag phase $t_R$, the voltage U and the current I take the polarity of the continuous voltage source 4 and it there is seen a strong increase of the current I during the discharge phase $t_C$, while the amplitude of the voltage U remains substantially the same as that during the preceding lag phase $t_R$.

The values of the voltage U between the electrode and the piece during the different phases could typically be between ±50 to ±200 V during the delay phase $t_D$, from 20 to 30 V during the sparking phase $t_A$, and 0 V during the pause phase.

The current I circulating between the electrode and the piece could typically have values from 2 to 6 A during the lag phase $t_R$ and peak currents of 500 A to 800 A during the discharge phase $t_C$. During this latter, the currents have a triangular shape because of the non-negligible line inductance. The increase phase of the current is of the order of a microsecond.

The continuous voltage source 4 is arranged so as to be able to supply an instantaneous power of about 1 to 1.5 KW and a voltage up to 300 V in a vacuum, which is to say when it does not flow.

According to another modification, there could be introduced a predetermined duration between the detection of the current between the electrode and the piece marking the end of the delay phase $t_D$ and the turning on of the source of continuous voltage. There would then be, as before, a delay phase $t_D$, a lag phase $t_R$, a discharge phase $t_C$ and a pause phase $t_B$. But a supplemental lag period $t'_R$ will be interposed between the delay phase $t_D$ and the lag phase $t_R$.

According to another very advantageous modification of the invention, the duration of the lag time $t_R$ of the principal voltage source is fixed so as to obtain for each discharge at least one period and one complete cycle of the alternating voltage comprising at least one positive pulse and one negative pulse, before the voltage of the principal source is applied. Thus, when the triggering conditions are very favorable, the duration $t_D$ of the delay time of triggering can become very short. The alternating voltage is then not applied during a very short duration before the principal discharge for a sequence of discharges, such that all the discharges will be triggered only at a single polarity, for example positive. Because of this, electrolysis can take place during this succession of rapid triggerings. On the contrary, when the alternating voltage always has a positive and negative alternation, there is no unilateral ionic migration.

Given that the delay time $t_D$ is random, one can then act on the lag time $t_R$ which depends on the principal voltage source, by fixing $t_R$ such that $$t_R \geq T - t_D$$

in which T is the period of the alternating voltage from the alternating voltage source. If the duration $t_D$ of the delay phase is very short, the duration of the lag time $t_R$ could be fixed to be equal to or greater than a period T of the alternating voltage.

Figure 11:
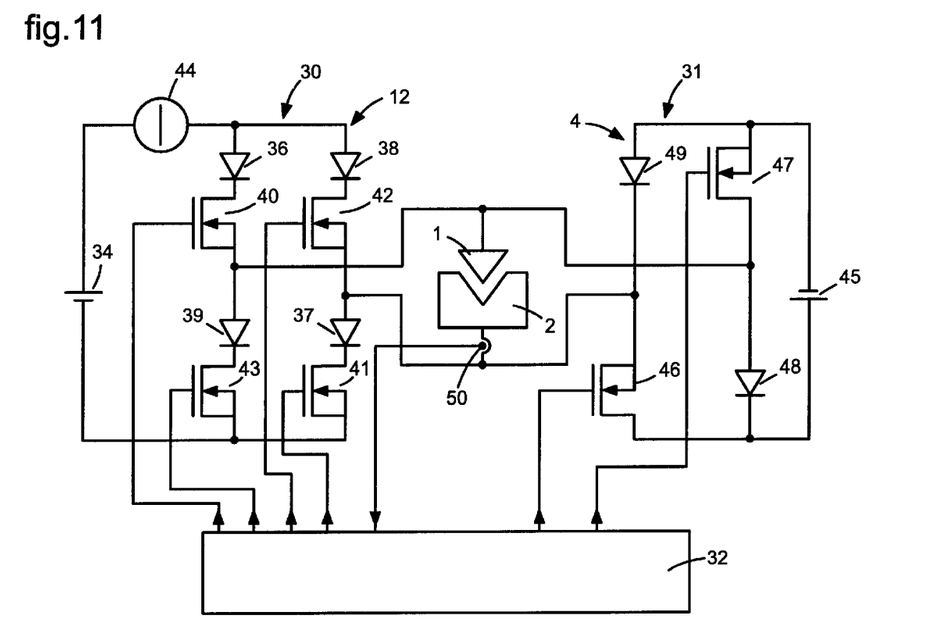
FIGS. 11 and 12 are electrical/electronic circuit diagrams of an embodiment and modification of a device for practicing the process according to the present invention.

An embodiment of the device for practicing the machining process as shown in FIGS. 5 to 8 is shown in FIG. 11. This device comprises an electric/electronic circuit with two principal branches 30, 33 each connected between the electrode 1 and the piece 2 to be machined. A first branch 30 serves as an alternating voltage generator 12 and the second branch 31 as a continuous voltage generator 4. The assembly of the circuit is controlled by a control unit 32.

The first branch 30 comprises a voltage source 34 adapted to supply a voltage comprised for example between 50 and 200 V for a power of the order of 300 W.

The positive terminal of this voltage source 34 is connected to the electrode 1 by a diode 36 and a switch 40 and the piece 2 by a diode 38 and a switch 42. The negative terminal of this source 34 is connected to the electrode 1 by a switch 43 and a diode 39 and to the piece by a switches 41 and a diode 37. Opening and closing the switches 40 to 43, constituted preferably by field effect transistors, are controlled by the control unit 32. The first branch 30 comprises moreover a current limiter 44 which could be integrated into the voltage source 34. A current detector 50 permits measuring the current I between the electrode 1 and the piece 2 and to transmit the result of these measurements to the control unit 32. This latter is arranged so as to close the transistors 40 and 41 to apply a voltage of positive polarity between the electrode 1 and the piece 2, the transistors 42 and 43 being open, and then to close the transistors 42 and 43 to apply a voltage of negative polarity between the electrode 1 and the piece, the transistors 40 and 41 being open.

This sequence of operations is repeated with a frequency that is constant, variable or modulated, as explained with reference to FIGS. 5A to 8A.

The second branch 31 comprises continuous voltage source 45 of a voltage of 200 to 300 V in vacuum, namely when it does not flow, and an instantaneous power of about 1 to 1.5 kW. The positive terminal of this source is connected to the piece 2 by a switch 46 and its negative terminal is connected to the electrode 1 by a switch 47. This branch 31 moreover comprises a diode 48 connecting the junction between the output of switch 47 and the electrode 1 at the input of switch 46, and a diode 49 connecting the input of the switch 47 to the junction between the output of the switch 46 and the piece 2. The switches 46 and 47 are preferably transistors whose opening and closing are controlled by the control unit 32. As was seen above, the continuous voltage generator 4 is turned on after the detection of a current by the detector 50, marking the end of the delay phase $t_D$. The control unit 32 controls for this purpose the closing of the switches 46, 47. This closing can be controlled immediately after detection of the current or after a predetermined lag period $t'_R$.

At the end of the sparking phase $t_A$, the control unit 32 controls the opening of the switches 46, 47 to turn off the continuous voltage generator 4 and also the opening of all the switches 40 to 43 of the first branch 30, if these switches have not already been opened previously. The erosive discharge is thus cut off and we enter the pause phase $t_B$ during which no voltage is applied between the electrode and the piece until complete deionization of the gap is obtained.

The next cycle can then be started by the delay phase $t_D$ by applying alternating voltage controlled by the control unit 32 according to the processes described with reference to FIGS. 5 to 8.

A modification of the device described above is shown in FIG. 12 and comprises a second branch 31 with a similar continuous voltage generator 4. The similar elements thus bear the same reference numerals. The first branch 30 comprising the alternating voltage generator 12 is of another type and comprises two voltage sources 55, 56 of reverse polarity and whose voltages are adjustable. A first source 55 is branched between the electrode 1 and the piece 2 by connecting its negative terminal to the electrode 1 by means of a switch 58, a current limiter 59 and a diode 60. The second source 56 is also branched in parallel between the electrode 1 and the piece 2 by connecting its positive terminal to the electrode 1 by means of a switch 61 and a current limiter 62. The control unit 32 can thus open and close alternately the switches 58 and 61 to render active the voltage sources 55 or 56 whose voltages are preferably different. There can thus be obtained with this modification of embodiment an alternating voltage as illustrated in FIG. 9 and comprising positive and negative voltage alternations of different amplitude and duration. The succession of the different phases $t_D$, $t_A$, $t_B$ during each discharge however remains the same.

Figure 12:
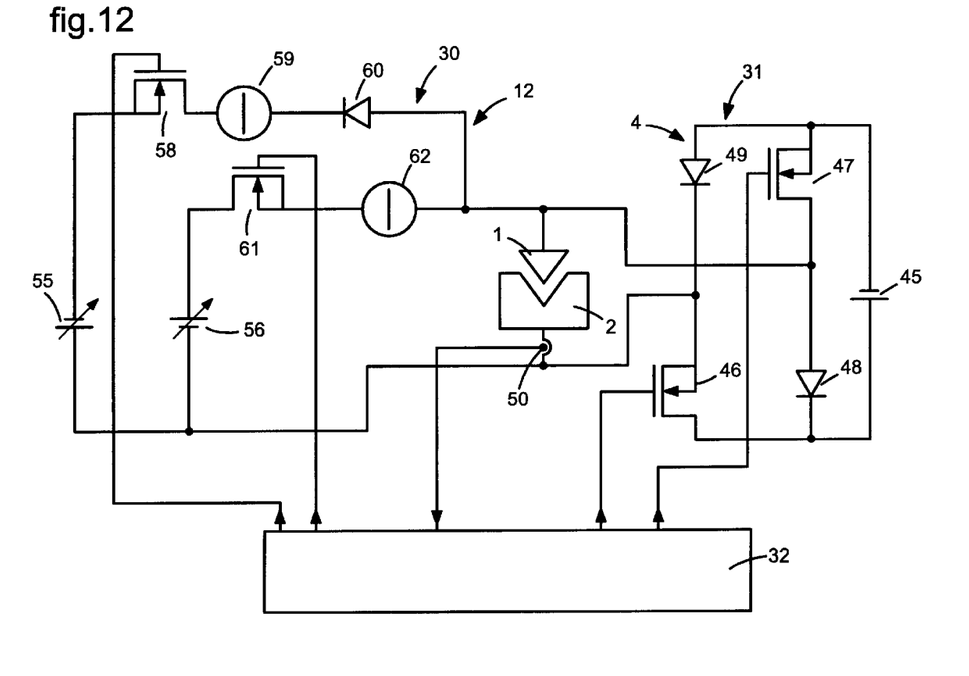

The values for the voltages of the sources 55, 56 and 45 could typically be 80, 100 and 300 V.

Of course the embodiments described above are in no wise limiting and can be the subject of all desirable modifications within the scope defined by the independent claims. In particular, the electronic circuits to generate the alternating and continuous voltages could be of any other type. Because of this, the diagrams of current I as a function of time could have rises and falls of the current during the current phase $t_C$ that are very different. The alternating voltage source could be cut at any moment after the triggering of the principal discharge, namely at the beginning of the current time $t_C$, and until the end of this latter. The device could comprise any means to regulate and fix the lag time $t_R$ to the actuation of the principal discharge.

What is claimed is:

1. Process for machining by electroerosion, according to which a piece is machined by means of a tool (1) separated from each other by a machining distance (L) of a working space (G) in which is located a machining fluid, by applying an electrical voltage between the tool and the piece to give rise to erosive discharges, characterized by the following succession of phases during an erosive discharge:

a) a delay phase ($t_D$) during which an alternating voltage is applied between the tool (1) of the piece (2) at a frequency such that the ions present in the machining fluid (3) follow oscillating paths (P2) substantially shorter than said machining distance (L) separating the tool and the piece and during which an ionized path is created between the tool and the piece by the effect of said alternating voltage, b) a sparking phase ($t_A$) beginning with the detection of a current flowing between the tool and the piece and during which a source of continuous voltage (4) forms and maintains an erosive discharge current (14) and c) a pause phase ($t_B$) during which no voltage is applied between the tool (1) and the piece (2) so that the machining fluid (3) present between the tool and the piece deionizes and the ionized path disappears;

and by the fact that this succession of phases is repeated for the duration of machining.

2. Process according to claim 1, characterized by the fact that the frequency of said alternating voltage is at least 100 kHz for a working space (G) having a machining distance (L) of 20 to 40 microns; by the fact that this frequency is increased when said distance is decreased and by the fact that this frequency is substantially 10 MHz for a distance substantially equal to 1 micron.

3. Process according to claim 1, characterized by the fact that the frequency of the alternating voltage is variable during the delay time ($t_D$).

4. Process according to claim 1, characterized by the fact that the frequency of the alternating voltage is fixed as a function of the ions contained in the machining fluid (3) for which the oscillating paths are to be controlled.

5. Process according to claim 3, characterized by the fact that the frequency of the alternating voltage decreases progressively within the delay phase ($t_D$) so as to sweep a spectrum of frequencies.

6. Process according to claim 1, characterized by the fact that there is established an alternating voltage such that the duration of the negative pulses will be different from that of the positive pulses.

7. Process according to claim 1, characterized by the fact that there is established an alternating voltage such that the amplitude of the negative pulses will be different from that of the positive pulses.

8. Process according to claim 6, characterized by the fact that there is established an alternating voltage such that the mean voltage of the discharges will be zero, or positive, or negative.

9. Process according to claim 1, characterized by the fact that the alternating voltage is blocked on the random polarity present at the moment of the detection of a current between the tool (1) and the piece (2).

10. Process according to claim 1, characterized by the fact that the alternating voltage is blocked at a predetermined polarity upon the detection of a current between the tool (1) and the piece (2) and by the fact that said predetermined polarity is preferably that which corresponds to the polarity of the continuous voltage source (4).

11. Process according to claim 1, characterized by the fact that the sparking phase ($t_A$) is subdivided into a lag time ($t_R$) corresponding to the duration of turning on the principal discharge by the continuous voltage source and a current time ($T_C$) corresponding to the erosive discharge, and by the fact that the duration of said lag time ($t_R$) is adjusted such that there is obtained for each erosive discharge at least one complete period of the alternating voltage comprising a positive pulse and a negative pulse.

12. Process according to claim 11, characterized by the fact that the lag time ($t_R$) is adjusted such that $$t_R \geq T - t_D$$

in which $t_R$ is the duration of the lag time,

T is the period of alternating voltage, and $t_D$ is the duration of the delay phase.

13. Process according to claim 11, characterized by the fact that the lag time ($t_R$) is adjusted so as to be equal to or greater than a period (T) of alternating voltage.

14. Process according to claim 1, characterized by the fact that there is introduced a predetermined lag period ($t'_R$) between the delay phase ($t_D$) and the sparking phase ($t_A$) by interposing a predetermined delay period between the detection of a current between the tool (1) and the piece (2) and the turning on of the continuous voltage source (4).

15. Device to practice a machining process by electro-erosion according to which a piece (2) is machined by means of a tool (1) they being separated from each other by a machining distance (L) in a working space (G) in which is located the machining fluid (3) by applying an electrical voltage between the tool and the piece, characterized by the fact that it comprises in combination an alternating voltage source arranged to produce, during a delay period ($t_D$) an alternating voltage between the tool (1) and the piece (2) at a frequency such that ions (6, 7) present in the machining fluid (3) follow oscillating paths (P2) substantially shorter than the machining distance (L) and that an ionized path is created between the tool and the piece, a detector adapted to detect a current between the tool and the piece, a continuous voltage source (4) arranged so as to form and maintain an erosive discharge current over a sparking phase ($t_A$) beginning with the detection of a current between the tool and the electrode, and a control unit (32) arranged so as to turn on said alternating and continuous voltage sources so as to obtain during erosive discharges a series of phases comprising said delay phase ($t_D$), said sparking phase ($t_A$) and a pause phase ($t_B$) during which no voltage is applied between the tool and the piece so that the machining fluid (3) between the tool (1) and the piece (2) deionizes and that the ionized path disappears.

16. Device according to claim 15, characterized by the fact that it comprises a first branch (30) and a second branch (31) connected in parallel between the tool (1) and the piece (2), the first branch (30) serving as an alternating voltage generator (12) and the second branch serving as a continuous voltage generator (4) and comprising a continuous voltage source (45) whose terminals are connected to the tool (1), respectively to the piece (2) by means of at least one switch (46, 47) and at least one diode (48, 49).

17. Device according to claim 16, characterized by the fact that the first branch (30) comprises a voltage source (34) of which a first terminal is connected to the tool (1) by means of a first diode (36) and a first switch (40) and to the piece (2) by means of a second diode (38) and a second switch (42) and of which a second terminal is connected to the tool (1) by means of a third switch (43) and by a third diode (39) and to the piece (2) by means of a fourth switch (41) and a fourth diode (37), the control unit (32) being arranged so as to close and open the first (40) and fourth (41) switches and then to open and close the second (42) and third (43) switches to obtain said alternating voltage.

18. Device according to claim 16, characterized by the fact that the first branch (30) comprises, connected in parallel between the tool (1) and the piece (2), two continuous voltage sources (55, 56) of reverse polarities and whose voltages are adjustable, the negative terminal of the first source (55) being connected to the tool (1) by means of a first switch (58) and a diode (60), the positive terminal of the second source (56) being connected to the tool (1) by means of a second switch (61), the control unit (21) being arranged so as to open and close alternately said switches (58, 61).

19. Device according to claim 15, characterized by the fact that it is arranged to turn on the erosive discharge current with a predetermined lag time ($t_R$) such that there is obtained for each erosive discharge at least the application of a complete period of alternating current.

20. Device according to claim 19, characterized by the fact that it is arranged such that $$t_R \geq T - t_D$$

where $t_R$ is the duration of the lag time,

T is the period of the alternating voltage, and $t_D$ is the duration of the delay phase, preferably $$t_R \geq T.$$

preferably.

* * * * *